US010193945B1

(12) United States Patent
Valentine

(10) Patent No.: US 10,193,945 B1
(45) Date of Patent: Jan. 29, 2019

(54) SYSTEMS AND METHODS FOR DISTRIBUTING MEDIA TO PERSONAL ELECTRONIC DEVICES

(71) Applicant: Paradigm Tech, LLC, Hoffman Estates, IL (US)

(72) Inventor: Robert T. Valentine, Ojai, CA (US)

( * ) Notice: Subject to any disclaimer, the term of this patent is extended or adjusted under 35 U.S.C. 154(b) by 0 days.

(21) Appl. No.: 15/845,360

(22) Filed: Dec. 18, 2017

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *H04L 29/06* | (2006.01) |
| *H04W 88/08* | (2009.01) |
| *H04W 4/42* | (2018.01) |
| *G08G 1/137* | (2006.01) |

(52) U.S. Cl.
CPC ............. *H04L 65/60* (2013.01); *G08G 1/137* (2013.01); *H04W 4/42* (2018.02); *H04W 88/08* (2013.01)

(58) Field of Classification Search
CPC ........ H04L 65/60; H04W 4/42; H04W 88/08; G08G 1/137
USPC ......................................................... 701/408
See application file for complete search history.

(56) References Cited

U.S. PATENT DOCUMENTS

| | | | | |
|---|---|---|---|---|
| 7,933,635 | B2* | 4/2011 | Oh ........................ | H04W 28/14 455/574 |
| 9,665,998 | B1* | 5/2017 | Shields .................. | G06Q 10/02 |
| 9,750,022 | B2* | 8/2017 | Liu .................... | H04W 72/0453 |
| 2005/0268120 | A1* | 12/2005 | Schindler .............. | G06F 1/3203 713/300 |
| 2005/0285781 | A1* | 12/2005 | Park ....................... | G01S 19/21 342/357.48 |
| 2006/0075934 | A1* | 4/2006 | Ram ...................... | B60N 3/004 108/44 |
| 2011/0211518 | A1* | 9/2011 | Gupta .................... | H04H 20/63 370/312 |
| 2014/0324333 | A1* | 10/2014 | Maeda ................... | G01C 21/20 701/431 |
| 2014/0337469 | A1* | 11/2014 | Bang-Olsen ............ | H04W 4/00 709/217 |
| 2014/0355578 | A1* | 12/2014 | Fink ...................... | H04W 88/08 370/338 |

* cited by examiner

*Primary Examiner* — Harry Y Oh
(74) *Attorney, Agent, or Firm* — Scherrer Patent & Trademark Law, P.C.; Stephen T. Scherrer; Monique A. Morneault

(57) ABSTRACT

Systems and methods for distributing media to computing devices are provided. Specifically, customers of airlines frequently desire media during a flight. The present invention provides various media, including audio, video, periodicals, maps for tracking purposes, and other like media to personal electronic devices, such as would be desired for a flight.

4 Claims, 1 Drawing Sheet

SYSTEMS AND METHODS FOR DISTRIBUTING MEDIA TO PERSONAL ELECTRONIC DEVICES

TECHNICAL FIELD

The present invention relates to systems and methods for distributing media to computing devices. Specifically, customers of airlines frequently desire media during a flight. The present invention provides various media, including audio, video, periodicals, maps for tracking purposes, and other like media to personal electronic devices, such as would be desired for a flight.

BACKGROUND

It is, of course, generally known to provide entertainment on flights, especially long flights requiring many hours of sitting within the passenger space of a jet during transport. In the past, airlines have incorporated in-flight entertainment features. Some of these features included shared audio and video, such as video on screens disposed at a front or at various sections of a jet's passenger space. However, these shared experiences were often difficult to view and/or hear, and did not provide a tailored in-flight entertainment experience to individual passengers.

Moreover, printed magazines and other periodicals were and still are often provided to passengers for their reading and viewing pleasure. However, oftentimes, magazines are prone to damage over time as readers continuously read and review, and must continually be replaced. Moreover, periodicals typically have timely, up-to-date information and must be continuously replaced with new issues.

Airlines have attempted to solve these problems by incorporating in-flight entertainment directly to passengers at each seat, such as by incorporating selectable audio or in-seat displays that may allow a passenger to select the particular audio, video, periodicals, or other like media. For example, individual control of media allowed passengers to decide for themselves which electronic multimedia to select and view or hear. However, these on-board, in-flight and in-seat systems have proven to be expensive and difficult to install and expensive and difficult to maintain. Consequently, many major airlines are removing these systems from their flights.

Some airlines have moved to offering multimedia to individuals on their own personal electronic devices. Thus, users, many of whom already travel with their personal electronic devices, can simply use their own devices to access electronic media during flights. Of course, access to media from sources outside of aircrafts is difficult, especially in view of restrictions on electronic signals from and to individual devices. Therefore, airlines have attempted to create accessible media servers that can be accessed by individuals during flights to obtain the media of their choice. However, many flights can have many, many passengers, all vying for limited bandwidth. Airlines have had difficulty providing robust systems that allow many users access and provide a smooth user experience without lag or buffering issues. Consequently, individuals may face slow response times, slow streaming or buffering, and their entertainment experience will be consequently affected.

Likewise, media servers accessible to individuals during flights, especially lengthy flights, typically have large power consumption requirements. An airplane in mid-flight often must supply power to the entertainment system as well, taxing systems that require precious power resources and increasing fuel consumption.

A need, therefore, exists for improved systems and methods for providing electronic media to personal electronic devices. More specifically, a need exists for improved systems and methods for providing electronic media to personal electronic devices in closed systems, such as on flights and in other confined spaces.

Moreover, a need exists for improved systems and methods for providing multimedia to personal electronic devices that are robust and can provide a smooth and buffer-free user experience. In addition, a need exists for improved systems and methods for allowing many users to access and download electronic media over a system without interference, no matter how many users are attempting to access.

Further, a need exists for improved systems and methods for providing multimedia to personal electronic devices that is relatively inexpensive to install, inexpensive to maintain, and easy to use. Moreover, a need exists for improved systems and methods for providing multimedia to personal electronic devices that provides easy access for updating the multimedia periodically as needed.

A need further exists for improved systems and methods for providing multimedia to personal electronic devices that is self-contained, portable and self-powered on an aircraft during flight. Likewise, a need exists for improved systems and methods having sufficient power via a battery that provides accessible multimedia content to individuals during the entirety of a flight without requiring supplemental power from the aircraft itself, and is usable and rechargeable using shore power.

SUMMARY OF THE INVENTION

The present invention relates to systems and methods for distributing media to computing devices. Specifically, customers of airlines frequently desire media during a flight. The present invention provides various media, including audio, video, periodicals, maps for tracking purposes, and other like media to personal electronic devices, such as would be desired for a flight.

To this end, in an embodiment of the present invention, a media streaming apparatus is provided. The media streaming apparatus comprises: a media streaming board for processing requests for media content; a storage module for storing the media content; and an access point, wherein the access point provides a Wi-Fi connection to a plurality of personal computing devices and further provides individually-tailored media streams of the media content to each of the plurality of personal computing devices for viewing and listening thereon, wherein the access point optimizes each of the media streams via: using airtime fairness to send and receive data based on time increments; using dual band transmitting on a 2.4 GHz radio band and a 5 GHz radio band; using band steering, wherein personal computing devices capable of sending and receiving the media streams over the 5 GHz radio band are automatically routed through the 5 GHz radio band; and using MIMO optimization using a plurality of antennas and spatial multiplexing modulation, wherein the access point is powered separately from the media streaming board.

In an embodiment, the media streaming apparatus is disposed on a passenger airplane.

In an embodiment, the access point is dynamically powered.

In an embodiment, power to the access point dynamically increases as the number of personal computing devices wirelessly connected thereto increases.

In an embodiment, the media streaming apparatus further comprises: no connection to the internet when the media content is streaming the media content to the plurality of personal computing devices.

In an embodiment, the media streaming apparatus further comprises an antenna for receiving global positioning information from global positioning satellites.

In an embodiment, the media content comprises a map, wherein the map shows the position of the media streaming apparatus based on the global positioning information received from the global positioning satellites.

In an alternate embodiment of the present invention, a system for streaming media content is provided. The system comprises: a passenger airplane; a media streaming apparatus on the passenger airplane comprising: a media streaming board for processing requests for media content; a storage module for storing the media content; and an access point, wherein the access point provides a Wi-Fi connection to a plurality of personal computing devices and further provides individually-tailored media streams of the media content to each of the plurality of personal computing devices for viewing and listening thereon, wherein the access point optimizes each of the media streams via: using airtime fairness to send and receive data based on time increments; using dual band transmitting on a 2.4 GHz radio band and a 5 GHz radio band; using band steering, wherein personal computing devices capable of sending and receiving the media streams over the 5 GHz radio band are automatically routed through the 5 GHz radio band; and using MIMO optimization using a plurality of antennas and spatial multiplexing modulation, wherein the access point is powered separately from the media streaming board.

In an embodiment, the access point is dynamically powered.

In an embodiment, power to the access point dynamically increases as the number of personal computing devices wirelessly connected thereto increases.

In an embodiment, the system further comprises: no connection to the internet when the media content is streaming the media content to the plurality of personal computing devices.

In an embodiment, the system further comprises: an antenna for receiving global positioning information from global positioning satellites.

In an embodiment, the media content comprises a map, wherein the map shows the position of the media streaming apparatus based on the global positioning information received from the global positioning satellites.

In yet another alternate embodiment of the present invention, a method for streaming media content is provided. The method comprises the steps of: providing a passenger airplane; providing a media streaming apparatus on the passenger airplane comprising: a media streaming board for processing requests for media content; a storage module for storing the media content; and an access point, wherein the access point provides a Wi-Fi connection to a plurality of personal computing devices and further provides individually-tailored media streams of the media content to each of the plurality of personal computing devices for viewing and listening thereon, wherein the access point optimizes each of the media streams via: using airtime fairness to send and receive data based on time increments; using dual band transmitting on a 2.4 GHz radio band and a 5 GHz radio band; using band steering, wherein personal computing devices capable of sending and receiving the media streams over the 5 GHz radio band are automatically routed through the 5 GHz radio band; and using MIMO optimization using a plurality of antennas and spatial multiplexing modulation, wherein the access point is powered separately from the media streaming board; streaming the media content to the plurality of personal computing devices from the media streaming apparatus.

In an embodiment, the access point is dynamically powered.

In an embodiment, the method further comprises the step of: increasing the power to the access point as the number of personal computing devices wirelessly connected thereto increases.

In an embodiment, the method further comprises the step of: streaming the media content to the plurality of personal computing devices in the absence of a connection of the media streaming apparatus to the Internet.

In an embodiment, the media streaming apparatus further comprises: an antenna for receiving global positioning information from global positioning satellites.

In an embodiment, the method further comprises the step of: receiving the global positioning information from the global positioning satellites.

In an embodiment, the media content comprises a map, and further comprising the steps of: showing the position of the media streaming apparatus on the map on at least one of the personal computing devices based on the global positioning information received from the global positioning satellites.

It is, therefore, an advantage and objective of the present invention to provide improved systems and methods for providing electronic media to personal electronic devices.

More specifically, it is an advantage and objective of the present invention to provide improved systems and methods for providing electronic media to personal electronic devices in closed systems, such as on flights and in other confined spaces.

Moreover, it is an advantage and objective of the present invention to provide improved systems and methods for providing multimedia to personal electronic devices that are robust and can provide a smooth and buffer-free user experience.

In addition, it is an advantage and objective of the present invention to provide improved systems and methods for allowing many users to access and download electronic media over a system without interference, no matter how many users are attempting to access.

Further, it is an advantage and objective of the present invention to provide improved systems and methods for providing multimedia to personal electronic devices that is relatively inexpensive to install, inexpensive to maintain, and easy to use.

Still further, it is an advantage and objective of the present invention to provide improved systems and methods for providing multimedia to personal electronic devices that provides easy access for updating the multimedia periodically as needed.

In addition, it is an advantage and objective of the present invention to provide improved systems and methods for providing multimedia to personal electronic devices that are self-contained, portable and self-powered on an aircraft during flight.

Likewise, it is an advantage and objective of the present invention to provide improved systems and methods having sufficient power via a battery that provides accessible multimedia content to individuals during the entirety of a flight without requiring supplemental power from the aircraft itself, and is usable and rechargeable using shore power.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to systems and methods for distributing media to computing devices. Specifically, customers of airlines frequently desire media during a flight. The present invention provides various media, including audio, video, periodicals, maps for tracking purposes, and other like media to personal electronic devices, such as would be desired for a flight.

Figure 1:
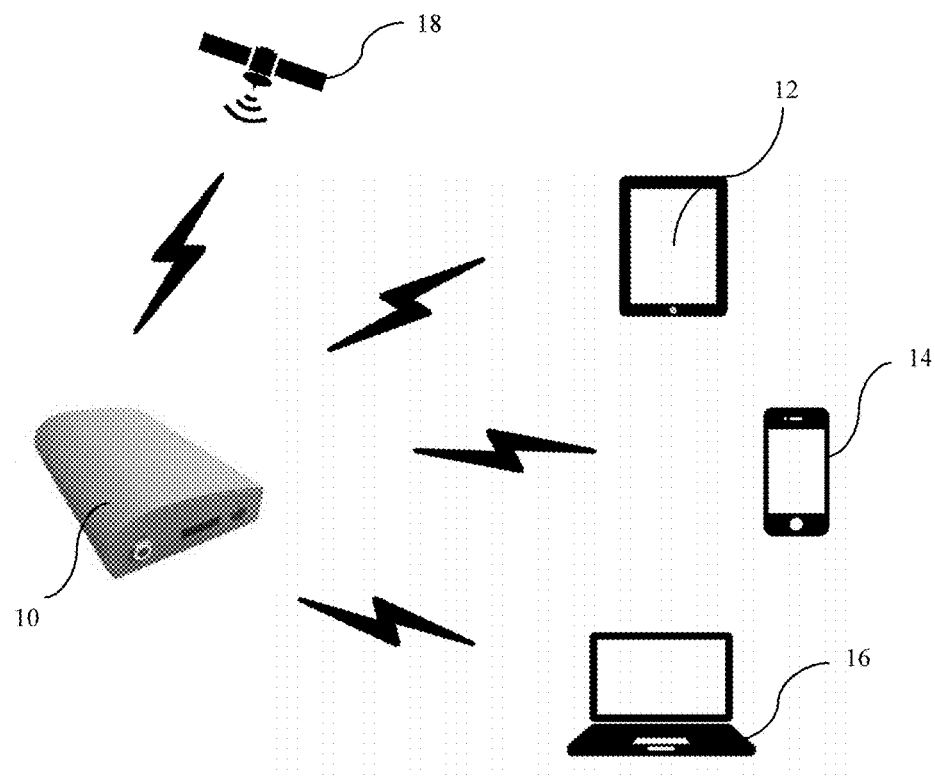
FIG. 1 illustrates a system of a media streaming apparatus, a plurality of personal computing devices, and a global positioning satellite in an embodiment of the present invention.

Now referring to the figures, wherein like numerals refer to like parts, FIG. 1 illustrates a media streaming apparatus 10 in an embodiment of the present invention. The media streaming apparatus 10 may be utilized to stream various media wirelessly to a plurality of personal computing devices, such as a computer table 12, a smart phone 14, a laptop computer 16, or any other personal computing device having a screen for displaying media streamed thereto.

Preferably, the media streaming apparatus 10 generally comprises a media streaming board, a storage module for storing media content thereon, and a Wi-Fi access point for wirelessly connecting the media streaming apparatus 10 to a plurality of users for obtaining the media content via data streams to the plurality of personal computing devices. It should be noted, however, that the media streaming apparatus may stream media to the personal computing device utilizing any wireless protocol known or subsequently developed for purposes of streaming media to personal computing devices and the present invention should not be limited as described herein. Generally, media content that may be streamed to personal computing devices may be video, audio, text, maps, or other like media, and the present invention should further not be limited. For example, the media content may take the form of movies, digital songs, e-magazines, or other like media content. The screens of the personal computing devices may show the media content streamed thereto from the media streaming apparatus 10, and the audio output of the personal computing device may present the audio to a listener thereof.

Preferably, the media streaming apparatus 10 is utilized on an airplane for providing media content to passengers that are traveling therein. Specifically, passengers often spend hours when traveling on an airplane, and must contend with being in a confined space. Typically, FAA regulations prevent passengers from obtaining media content via cellular protocols, and therefore the passengers are typically beholden to entertainment provided on the airplane itself without an Internet connection. Thus, the present invention may be utilized to provide media content to a plurality of passengers, without lagging or untimely disconnections.

As noted above, passengers on an airplane may utilize their own personal computing devices, such as their own tablet computers, smart phones, laptop computers, or other like personal computing devices to access the media content on the media streaming apparatus 10. The media streaming apparatus 10 may provide the media content to the passengers preferably without an external connection to the Internet or other network, and is entirely self-contained.

Maps may further be provided to passengers as media content, and global positioning may be determined to track the airplanes location while in transit. Specifically, one or more satellites 18 may communicate wirelessly with the media streaming apparatus 10 and be utilized to triangulate the position of the media streaming apparatus 10, and hence the airplane it is traveling within, to show its relative position on a map that may be provided to the passenger using the media streaming apparatus 10.

To accomplish robust and efficient media streaming to a plurality of personal computing devices, the media streaming apparatus may contain hardware and software necessary to accomplish such a task. Specifically, the media streaming apparatus may have software and hardware allowing Wi-Fi signals to be sent and received thereby via the access point. Likewise, the media streaming apparatus 10 may contain hardware, software and necessary protocols to interact with the global positioning satellites for triangulating a position thereof.

Figure 2:
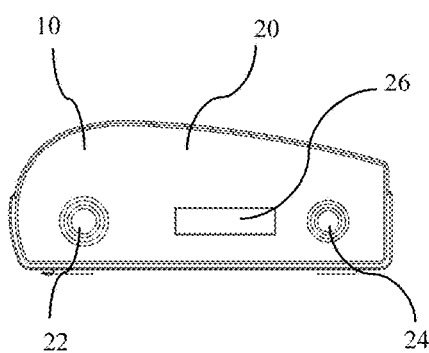
FIG. 2 illustrates a first side view of the media streaming apparatus in an embodiment of the present invention.

FIG. 2 illustrates a first side 20 of the media streaming apparatus 10. On the first side 20, a power switch 22 may be provided. A battery display button 24 may also be provided that, when pressed, provides a visual indication of the battery charge of the media streaming apparatus 10 via a display 26.

Figure 3:
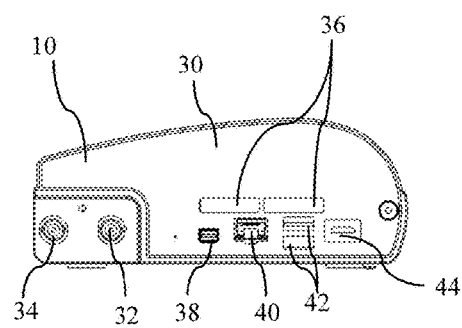
FIG. 3 illustrates a second side view of the media streaming apparatus in an embodiment of the present invention.

FIG. 3 illustrates a second side 30 of the media streaming apparatus 10. On the second side 30, a GPS antenna port 32 may be provided, allowing a GPS antenna to be plugged therein when the media streaming apparatus 10 is configured to determine its global position and to display the same on a map accessible to a passenger. A second port 34 may be provided that may be utilized for interconnecting with any other needed hardware, depending on the desired application thereof.

Cooling vents 36 may further be provided to allow for the flow of relatively cool air throughout the media streaming apparatus 10. Further, a mini display port 38 may be provided to allow a display to plug directly into the media streaming apparatus 10. An Ethernet port 40 may further be provided for tying the media streaming apparatus 10 to another computing device or server; preferably, the Ethernet port 40 may be utilized to allow the media streaming apparatus 10 access to the Internet for updating and for replacing or obtaining additional media content when needed, such as monthly. USB slots 42 may also be provided for connecting a USB-enabled apparatus, as needed. Further, an HDMI port 44 may be provided for connecting an HDMI-enabled apparatus thereto, as needed.

The media streaming apparatus 10 may preferably have a relatively small profile, and may generally be small enough to carry on and easily install on a passenger airplane. Preferably, the media streaming apparatus 10 is about 10 inches long, about 6.5 inches wide, and ranges from 1.5 to about 2.5 inches tall. Of course, the media streaming apparatus 10 may be any size, but preferably is portable and can be carried off and on an airplane with ease.

In addition, the media streaming apparatus 10 may be utilized to meet the streaming demands of any number of passengers. Oftentimes, Wi-Fi networks from media servers can easily become bogged down as the number of users scales up. The media streaming apparatus 10, however, may be utilized to easily stream different media content to more than 300 passengers at a time, for example, without lag, disconnections, or other like issues.

To accomplish this goal of providing media content to any number of passengers on an airplane, a number of protocols are utilized, namely: airtime fairness, band steering, dual radio access points with MIMO optimization, bandwidth shaping, and high powered access point separate from the PCB of the media streamer. Each is discussed in greater detail below.

Airtime fairness is implemented to provide fairness of data transfer depending on the speed of the personal computing devices. Specifically, older personal computing devices may utilize slower communication protocols, such as 802.11g or earlier technology. A personal computing device transmitting at 802.11n, of course, has faster throughput. However, when streaming data packets without airtime fairness, the speed of data transfer to the personal computing devices slows down to the slowest on the Wi-Fi network, because a packet of data sent over 802.11g flows slower than a similar-sized packet over 802.11n. The media streaming apparatus 10 streams media content using airtime fairness based on time instead of packet-size, so that each passenger using their personal computing device obtains as much data over a set period of time as their device can receive based on their personal computing device's Wi-Fi speed.

Moreover, the media streaming apparatus 10 may utilize band steering to allocate streams of media content based on whether a personal computing device is able to stream data over 5 GHz or whether the personal computing device must stream over 2.4 GHz. Oftentimes, personal computing devices of passengers are configured incorrectly, set to send and receive data over 2.4 GHz instead of the interference-free 5 GHz, which can bog down the 2.4 GHz band when too many users are connected. Thus, band steering steers passenger's personal computing devices to 5 GHz when capable of sending and receiving over 5 GHz, even if they have improperly configured their devices to send and receive over the slower 2.4 GHz. While the 2.4 GHz band may typically reach further than the 5 GHz band, on an airplane this is typically not an issue due to the confined space within which the passengers sit. Therefore, the media streaming apparatus 10 may use band steering to force personal computing devices over the 5 GHz band that are capable of sending and receiving over the 5 GHz band.

The media streaming apparatus 10 may further speed up and optimize data streams using dual radio access points and MIMO technologies. Specifically, the media streaming apparatus utilizes a 2.4 GHz band and a 5 GHz band, as discussed above, and further may optimize the transmission of data using 3×3 (in the case of the 2.4 GHz radio band) and 2×2 (in the case of the 5 GHz radio band) MIMO optimization. Therefore, the media streaming apparatus 10 may utilize multiple antennas (at least two) to send multiple independent streams of data, and further utilize spatial multiplexing modulation techniques of the streams of data over the same frequencies to prevent garbling of the data streams. Thus, much more data can be sent and received using the MIMO techniques at a given time.

In addition, the media streaming apparatus 10 may utilize bandwidth traffic shaping to throttle data streams depending on the number of passengers streaming media at any given time from the media streaming apparatus 10. Thus, the media streaming apparatus 10 may detect the numbers of users at any given time, and may allocate resources based on the number of users connected and the usage by individual passengers to ensure that all users are allocated data streams fairly. Thus, where there are a relatively small number of users, the maximum throughput speed may be relatively high so that each passenger obtains a fair allocation of the data stream. Likewise, if the total number of users is relatively large, then maximum throughput for each user may be throttled so that, again, all users obtain a fair allocation of the data stream, and so the media streaming apparatus 10 can stream data to the relatively large number of users.

In addition, the access point of the media streaming apparatus 10 may utilize a relatively high power access point that is separate from the media streaming board. As the numbers of users of the media streaming apparatus 10 increases, the power output of the access point likewise increases. This may be useful in a situation with a large number of users, where dynamically increasing the power of the access point minimizes connection problems between the media streaming apparatus 10 and plurality of personal computing devices.

The media streaming apparatus 10 of the present invention is preferably self-contained, portable, and self-powered, not requiring power drawn from an aircraft during flights. Specifically, the media streaming apparatus comprises a battery pack having sufficient charge to provide the aforementioned power output of the access point and other components to provide the multimedia content to the plurality of users over, preferably, the entirety of the flight. Thus, the media streaming apparatus 10 may operate without tapping power from the aircraft, allowing the aircraft to utilize its power for other purposes and decreasing fuel consumption. Preferably, the battery charge of the media streaming apparatus 10 may provide multimedia content to the plurality of users for up to 12 hours on a single charge, although the media streaming apparatus 10 may provide more battery life as batteries become smaller and more efficient. In addition, the media streaming apparatus 10 may preferably be tied into shore power when the aircraft is parked. Thus, the media streaming apparatus 10 may be utilized on battery power or shore power, as necessary and available.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

I claim:
1. A media streaming apparatus comprising:
a media streaming board for processing requests for media content;
a storage module for storing the media content;

a battery pack for supplying power to the media streaming apparatus without tapping power from any other source while in use;

an antenna for receiving global positioning information from global positioning satellites; and an access point, wherein the access point provides a Wi-Fi connection to a plurality of personal computing devices and further provides individually-tailored media streams of the media content to each of the plurality of personal computing devices for viewing and listening thereon, wherein the access point optimizes each of the media streams via:

using airtime fairness to send and receive data based on time increments;

using dual band transmitting on a 2.4 GHz radio band and a 5 GHz radio band;

using band steering, wherein personal computing devices capable of sending and receiving the media streams over the 5 GHz radio band are automatically routed through the 5 GHz radio band; and using multiple input/multiple output optimization using a plurality of antennas and spatial multiplexing modulation, wherein the access point is powered separately from the media streaming board, wherein the access point is dynamically powered wherein power to the access point dynamically increases as the number of personal computing devices wirelessly connected thereto increases, wherein there is no connection to the Internet when streaming the media content to the plurality of personal computers;

wherein the media content comprises a map, wherein the map shows the position of the media streaming apparatus based on the global positioning information received from the global positioning satellites.

2. The media streaming apparatus of claim 1 wherein the media streaming apparatus is disposed on a passenger airplane.

3. A system for streaming media content comprising:
a passenger airplane;
a media streaming apparatus on the passenger airplane comprising;
a media streaming board for processing requests for media content;
a storage module for storing the media content;
a battery pack for supplying power to the media streaming apparatus without tapping power from the passenger airplane during flight of the passenger airplane;
an antenna for receiving global positioning information from global positioning satellites; and
an access point, wherein the access point provides a Wi-Fi connection to a plurality of personal computing devices and further provides individually-tailored media streams of the media content to each of the plurality of personal computing devices for viewing and listening thereon,
wherein the access point optimizes each of the media streams via:
using airtime fairness to send and receive data based on time increments;
using dual band transmitting on a 2.4 GHz radio band and a 5 GHz radio band;
using band steering, wherein personal computing devices capable of sending and receiving the media streams over the 5 GHz radio band are automatically routed through the 5 GHz radio band; and
using multiple input/multiple output optimization using a plurality of antennas and spatial multiplexing modulation,
wherein the access point is powered separately from the media streaming board via the battery pack,
wherein the access point is dynamically powered from the battery pack wherein power to the access point dynamically increases as the number of personal computing devices wireless connected thereto increases;
where there is no connection to the internet when streaming the media content to the plurality of personal computing devices,
wherein the media content comprises a map, wherein the map shows the position of the media streaming apparatus based on the global positioning information received from the global positioning satellites.

4. A method for streaming media content comprising:
providing a passenger airplane;
providing a media streaming apparatus on the passenger airplane comprising;
a media streaming board for processing requests for media content;
a storage module for storing the media content;
a battery pack for supplying power to the media streaming apparatus without tapping power from the passenger airplane during flight of the passenger airplane;
an antenna for receiving global positioning information from global positioning satellites; and
an access point, wherein the access point provides a Wi-Fi connection to a plurality of personal computing devices and further provides individually-tailored media streams of the media content to each of the plurality of personal computing devices for viewing and listening thereon,
wherein the access point optimizes each of the media streams via:
using airtime fairness to send and receive data based on time increments;
using dual band transmitting on a 2.4 GHz radio band and a 5 GHz radio band;
using band steering, wherein personal computing devices capable of sending and receiving the media streams over the 5 GHz radio band are automatically routed through the 5 GHz radio band; and
using multiple input/multiple output optimization using a plurality of antennas and spatial multiplexing modulation,
wherein the access point is powered separately from the media streaming board;
receiving the global positioning information from the global positioning satellites;
streaming the media content to the plurality of personal computing devices from the media streaming apparatus in the absence of a connection of the media streaming apparatus to the Internet;
showing the position of the media streaming apparatus on the map on at least one of the personal computing devices based on the global positioning information received from the global positioning satellites; and
dynamically powering the access point by increasing power to the access point as the number of personal computing devices wirelessly connected thereto increases.

* * * * *